United States Patent Office 2,977,317
Patented Mar. 28, 1961

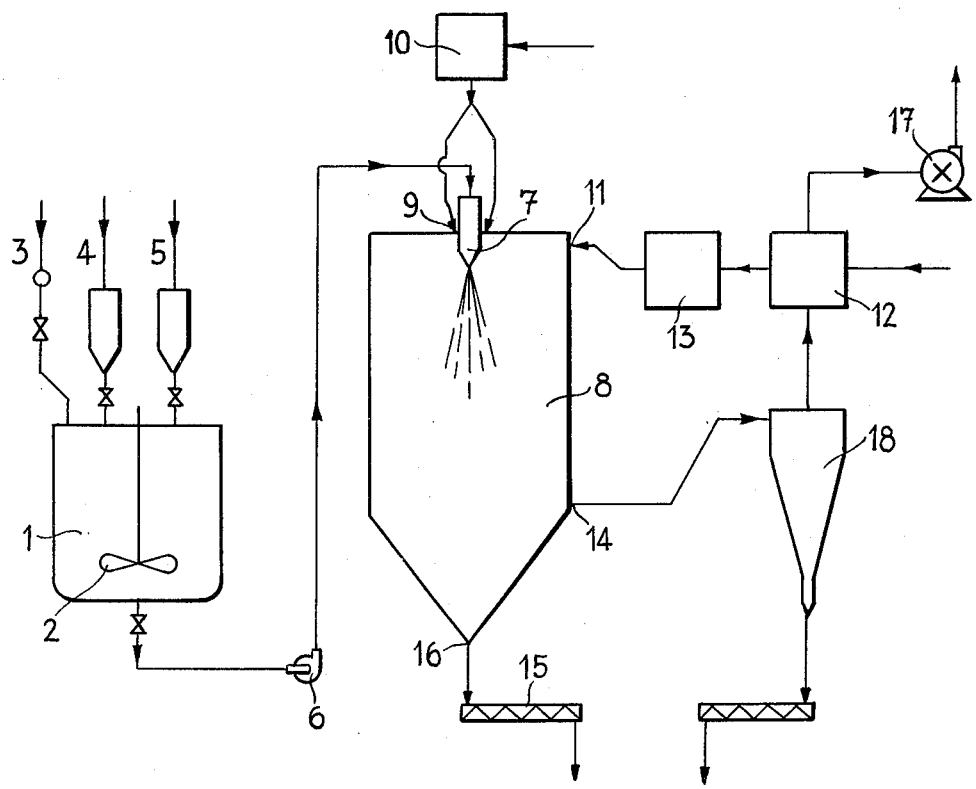

2,977,317

PROCESS FOR PRODUCING COMPOSITIONS CONTAINING SODIUM TRIPOLYPHOSPHATE

Franz Rodis, Knapsack, near Koln, and Johannes Krause and Klaus Beltz, Hurth, near Koln, Germany, assignors to Knapsack-Griesheim Aktiengesellschaft, Knapsack, near Koln, Germany, a corporation of Germany Filed Oct. 10, 1955, Ser. No. 539,543

Claims priority, application Germany Oct. 21, 1954

6 Claims. (Cl. 252—135)

This invention relates to compositions containing sodium tripolyphosphate and to a process for producing the compositions.

Such compositions contain sodium tripolyphosphate in the low temperature modification in an amount ranging from about 30 percent to 100 percent, and moreover, substantially contain sodium tripolyphosphate in the high temperature modification.

It is known that there are two different crystalline modifications of sodium tripolyphosphate ($Na_5P_3O_{10}$), both of which belong to the monoclinic system of crystallization. The high temperature modification of sodium tripolyphosphate, the form I and defined hereinafter as $Na_5P_3O_{10}$ I is within the range of about 450° C. and about 580° C., i.e. the melting point of sodium tripolyphosphate. The low temperature modification, the form II and defined hereinafter as $Na_5P_3O_{10}$ II, is stable at a temperature of below about 450° C. Both forms have the very same chemical properties, and solutions prepared therefrom are identical. Due to some differences in their physical behaviour, it is, however, more advantageous to use $Na_5P_3O_{10}$ II than $Na_5P_3O_{10}$ I for the production of washing agents obtained by spraying and containing sodium tripolyphosphate. The latter compound, form I, is more rapidly hydrated than form II with formation of $Na_5P_3O_{10} \cdot 6H_2O$ when brought into contact with water. By dissolution of or suspending a larger amount of $Na_5P_3O_{10}$ in water, form I, contrary to form II, gives rise to agglomerations consisting of $Na_5P_3O_{10} \cdot 6H_2O$ which complicate the further treatment.

For the production of sodium tripolyphosphate on an industrial scale, processes are used which are based on the dehydration of suitable phosphates. If $Na_5P_3O_{10}$ II is to be prepared, it has proved insufficient to conduct the known processes at a temperature of below 450° C., that is to say in the range of temperature where $Na_5P_3O_{10}$ II is stable.

Now, we have found sodium tripolyphosphate compositions which contain sodium tripolyphosphate in the low temperature modification in an amount ranging from about 30 percent to 100 percent, and moreover, substantially contain sodium tripolyphosphate in the high temperature modification, and a new process for producing same. Such compositions can be obtained by dehydration of at least one phosphate selected from the group consisting of sodium orthophosphates and sodium pyrophosphates, at a temperature below about 450° C. in the presence of a content of water vapor of about 20 to 100 percent by volume of the gaseous phase surrounding the phosphate to be dehydrated. There may be used, for example, mixtures of di-sodium orthophosphate ($Na_2HPO_4$)

and mono-sodium orthophosphate ($NaH_2PO_4$) in a molar proportion of $Na_2HPO_4:NaH_2PO_4$ about 2:1. It is advantageous to use a finely dispersed and finely pulverulent mixture of these substances, which mixture is dehydrated according to this invention by heating it to a temperature of below about 450°, for example 400° C. There may be used, for example, a material of a fineness in the grain structure such that it passes through a sieve having 10,000 meshes per square cm. It is also possible to use a coarser substance having a grain size up to about 5 mm.

Instead of a mixture of sodium orthophosphates as before mentioned, it is also possible to use as starting material a mixture consisting of sodium orthophosphates and sodium pyrophosphates in any desired proportion, which mixture is then treated according to this invention, the molar ratio of $Na_2O:P_2O_5$ being always about 5:3. Mixtures of various sodium pyrophosphates may also be used, for example a mixture consisting of $Na_4P_2O_7$ and $Na_2H_2P_2O_7$ in a molar ratio of about 2:1. To maintain a content of water vapor of about 20 to 100 percent by volume in the gaseous phase surrounding the phosphate to be dehydrated, the starting material to be dehydrated can be brought into contact with a current of water vapor, or a mixture of air and water vapor, for example by passing such current above or through the starting material. The process of this invention can be conducted using the conventional devices for the production of sodium tripolyphosphate. The sodium tripolyphosphate compositions obtained are practically free from pyrophosphates and have a particularly high capacity to bind lime.

The process of this invention offers the particular advantage to produce sodium tripolyphosphate of a special purity and uniformity.

The compositions obtained by the process of this invention can be used with special advantage for softening water, and in the production of washing agents. They may also be used as emulsifiers in the cement industry and paper industry and for the production of cheese and other food.

A product having particularly advantageous properties can be obtained according to this invention using a gaseous phase consisting of water vapour and being free or almost free from air. It is also possible to prepare mixtures of $Na_5P_3O_{10}$ I and $Na_5P_3O_{10}$ II in any desired proportion using an appropriate mixture of water vapor and air.

The water vapor content of the gaseous phase surrounding the phosphate to be dehydrated alone is not decisive for the proportion of $Na_5P_3O_{10}$ I:$Na_5P_3O_{10}$ II of the composition obtained. Such proportion is also influenced for instance by the heat velocity.

In the production of $Na_5P_3O_{10}$ II or mixtures thereof with $Na_5P_3O_{10}$ I according to this invention, the content of water vapor of the gaseous phase and the rate of heating are, therefore, balanced against one another. A high content of vapor and a small velocity of heating favor the formation of $Na_5P_3O_{10}$ II whereas a low content of water vapor and a high velocity of heating favor the formation of $Na_5P_3O_{10}$ I.

The partial pressure of water vapor can be attained by adding water or water vapor, or by retaining the water formed during the reaction and not allowing it to escape from the apparatus.

It has also been found particularly advantageous to conduct the dehydration of the solutions containing the aforenamed phosphates by spray-drying, the gaseous phase consisting of superheated water vapor having a temperature of 200° C. to 450° C. The dehydration by spraying may also be conducted in a manner such that during the drying process the gaseous phase consists of gaseous mixtures having a temperature of 200° C. to 450° C. and containing superheated water vapor, during which process additional superheated water vapor is blown into the mixture. It is advisable to blow in such additional water vapor in a manner such that it strikes the sprayed phosphate solution when it first comes into contact with the hot gas. Solutions suitable for being spray-dried can be obtained, for example, by mixing orthophosphoric acid, advantageously diluted with water, with sodium carbonate, during which operation the temperature is advantageously raised to about 80° C. or about 100° C.

It is advisable to use concentrated phosphates, for example saturated solutions of the phosphates. It is, however, also possible to use dilute silutions, for example, of 10 percent strength, and to treat such solutions as described above.

The starting material can also be sprayed in a manner such that vapor under pressure is used as dispersing medium. It is advantageous to use a pressure between about 0.5 and about 10 atmospheres (gauge). In special cases, i.e. when a particularly fine atomization is desired, still higher pressures can be applied.

Contrary to this conventional spray-drying process in which a fairly dry gaseous phase is used, the process of this invention is conducted using the spray-drying process and in the presence of a gaseous phase consisting of superheated water vapor or gaseous mixtures containing water vapor. The temperature of the gaseous phase may be, for example, 250° C. to 450° C.

Thus, for example, the dehydration may be effected in a spraying tower by spraying the solution of the starting material. In this case, care must be taken that the partial pressure of the water vapor in the spraying tower is fairly high. This can be attained by enriching the aspirated air with water vapor. In a borderline situation, for example, in order to produce pure $Na_5P_3O_{10}$, it is possible to spray the solution in an atmosphere of pure superheated water vapor. The thermal capacity of the mixture of water vapor and air, or in a borderline situation, of superheated water vapor suffices not only to evaporate the solvent water but also to conduct the thermal dehydration. A dry sodium tripolyphosphate is obtained in the form II.

The spray drying may be used in the process of this invention with particular advantage by conducting the spray drying with a binary nozzle using a spraying medium water vapor under pressure or gaseous mixtures containing water vapor, instead of compressed air which is usually applied. Thereby a highly increased partial pressure of water vapor is obtained, particularly in the neighbourhood of the sprayed particles.

The new spraying process can also be conducted in a manner such that superheated water vapor is additionally used which, for example, is blown into the spraying tower.

It has proved to be particularly advantageous to introduce such additional water vapor so that it strikes the sprayed phosphate solution, when the latter for the first time comes into contact with the hot gas.

Thus, for example, water vapor is blown into that zone of the spraying tower in which the sprayed solution for the first time comes into contact with the hot gas. An apparatus suitable for use in carrying out the process of this invention is illustrated diagrammatically in the accompanying drawing.

1 represents a vessel provided with a stirrer 2, a water feed pipe 3, a soda feed pipe 4 and a feed pipe 5 for orthophosphoric acid. In vessel 1, orthophosphoric acid, soda and water are mixed to form a solution of orthophosphates. With the aid of pump 6 and spraying nozzle 7, the solution obtained is sprayed into spraying tower 8. At 9, near nozzle 7, vapor is introduced into spraying tower 8. In steam heater 10 the vapor introduced is given the desired temperature of, for example 420° C. At 11, fresh air is introduced into spraying tower 8. Prior to the introduction of the air, it is given the desired temperature of, for example, 450° C. first in heat exchanger 12 and then in air heater 13. By means of nozzle 7, the solution is sprayed with a velocity such that the waste gas leaving the spraying tower 8 at outlet 14 has a temperature of about 300° C. to 350° C. With the aid of a screw conveyor the spray-dried material is withdrawn at 16 from spraying tower 8. By means of a fan 17, the waste gas rich in water vapor of spraying tower 8 is sucked through dust remover 18 and heat exchanger 12. In the heat exchanger 12, the major part of the heat of the waste gas is transferred to the fresh air.

The following examples serve to illustrate the invention, but they are not intended to limit it thereto. Examples 1 and 2 describe the dehydration of a finely pulverulent mixture containing $Na_2HPO_4$ and $NaH_2PO_4$ in a molar proportion of 2:1 and which can pass through a sieve having 10,000 meshes per square centimeter. The dehydration is conducted by a uniform heating to 400° C. at a heat velocity as stated below to obtain $Na_5P_3O_{10}$. The material is placed into a porcelain boat situated in a quartz tube, through which is passed a measured current of air, water vapor or mixtures of both substances. The quartz tube is heated by an electric tube furnace. To enable an exact measurement of the temperature, a blank measuring point of a platinum-platinum-rhodium-element is dipped into the powder.

Example 3 particularly describes the process of this invention when conducted on an industrial scale.

Example 1

Dehydration is effected at a heat velocity such that the increase in temperature in the reaction mass amounts to 5° C. per minute.

| Composition of the gaseous phase | Composition of the final product | |
|---|---|---|
| | Percent $Na_5P_3O_{10}$ I | Percent $Na_5P_3O_{10}$ II |
| Percent by volume water vapor: | | |
| 0 | 100 | 0 |
| 25 | 90 | 10 |
| 44 | 40 | 60 |
| 51 | 30 | 70 |
| 67 | 10 | 90 |
| 79 | 0 | 100 |
| 100 | 0 | 100 |

Example 2

Dehydration is effected at a heat velocity such that the increase in temperature in the reaction mass amounts to 15° C. per minute.

| Composition of the gaseous phase | Composition of the final product | |
|---|---|---|
| | Percent $Na_5P_3O_{10}$ I | Percent $Na_5P_3O_{10}$ II |
| Percent by volume water vapor: | | |
| 0 | 100 | 0 |
| 44 | 90 | 10 |
| 56 | 50 | 50 |
| 65 | 30 | 70 |
| 72 | 20 | 80 |
| 79 | 10 | 90 |
| 87 | 0 | 100 |
| 100 | 0 | 100 |

The above examples illustrate the influence of the content of water vapor at a different heat velocity. At a heat velocity as indicated above and depending on the composition of the gaseous phase, sodium tripolyphosphate compositions can be obtained which contain up to about 100 percent of $Na_5P_3O_{10}$ II.

Example 3

75 kilograms of orthophosphoric acid of 75 percent strength are diluted with 37 liters of water and then neutralized at a temperature of about 80° C. to 100° C. with 53.4 kilograms of sodium carbonate solution of 98 percent strength. With the aid of vapor under a pressure of 6 atmospheres (gauge) the solution is sprayed from a binary nozzle within 10 minutes into a spraying tower through which air is adsorbed which has been preheated to 450° C. Into the spraying tower, additional vapor is blown in a quantity such that the waste gas of the spraying tower contains 40 percent by volume of water vapor. The sodium tripolyphosphate isolated from the outgoing air which leaves the spraying tower with a temperature of 350° C. is obtained as $Na_5P_3O_{10}$ II having a degree of purity of at least 98 percent.

The use of water vapor in the process of this invention enables a higher velocity to be applied in the production of sodium tripolyphosphate, whereby, depending on the amount of water vapor present, pure $Na_5P_3O_{10}$ II or mixtures containing $Na_5P_3O_{10}$ II are obtained. The sodium tripolyphosphate is obtained in a higher degree of purity, a particularly high capacity to bind lime and a favorable physical form.

We claim:

1. Process for producing sodium tripolyphosphate consisting of both the high-temperature modification form I and the low-temperature modification form II and containing the low-temperature modification form II in a portion of at least 30 percent by weight, comprising spraying an aqueous sodium orthophosphate solution together with hot air into a spray tower having an air atmosphere which has a temperature range of 200 to 450° C., said air atmosphere containing at least 20 percent by volume of steam.

2. Process for the preparation of sodium tripolyphosphate consisting of both the high-temperature modification form I and the low-temperature modification form II and containing the low-temperature modification form II in a portion of at least 30 percent by weight, comprising spraying an aqueous solution of sodium orthophosphate together with hot air into a spray tower having an air atmosphere which has a temperature range of 200 to 450° C., and additionally supplying steam to the air atmosphere, said air atmosphere containing at least 20 percent by volume of steam.

3. Process according to claim 2 wherein the additional steam is introduced under excess pressure.

4. Process according to claim 2 wherein the steam is superheated and contacts the sprayed phosphate solution at the solution's initial point of contact with the hot air.

5. Process for the preparation of sodium tripolyphosphate consisting of both the high-temperature modification form I and the low-temperature modification form II and containing the low-temperature modification form II in a portion of at least 30 percent by weight, comprising spraying an aqueous sodium orthophosphate solution together with hot air into a spray tower and additionally supplying superheated steam under excess pressure into the spray tower, contacting the additional steam with the sprayed phosphate solution at the point of initial contact of the solution with the hot air in an air atmosphere within the tower which has a temperature range of 200 to 450° C., said air atmosphere containing at least 20 percent by volume of steam.

6. Process for the preparation of sodium tripolyphosphate consisting of both the high-temperature modification form I and the low-temperature modification form II and containing the low-temperature modification form II in a portion of at least 98 percent by weight, comprising spraying an aqueous sodium orthophosphate solution of up to 100° C. together with air of about 450° C. into a spray tower, additionally supplying steam at about 6 atmospheres excess pressure into the tower, contacting the sprayed phosphate solution with the additional steam at the point of initial contact of the solution with the hot air in an air atmosphere within the tower of about 450° C. and containing at least 40 percent by volume of steam, said air atmosphere leaving the spray tower as waste-air of about 350° C.

References Cited in the file of this patent

UNITED STATES PATENTS

| 2,572,362 | Markson | Oct. 23, 1951 |
| 2,622,068 | Hizer | Dec. 16, 1952 |
| 2,712,529 | Mills | July 5, 1955 |

OTHER REFERENCES

Partridge: "Thermal, Microscopic and X-Ray Studies of System $NaPO_3-Na_4P_2O_7$," Journal of the American Chemical Soc., vol. 63, pages 454–466, February 1941.